United States Patent [19]

Chudakov

[11] Patent Number: 4,789,094

[45] Date of Patent: Dec. 6, 1988

[54] DEVICE FOR ALIGNMENT OF CYLINDRICAL WORKPIECES FOR MAGNETIC-DISCHARGE WELDING

[75] Inventor: Vyacheslav A. Chudakov, Kiev, U.S.S.R.

[73] Assignee: Institut electrosvarki imeni e.o. Patona, Kiev, U.S.S.R.

[21] Appl. No.: 153,267

[22] PCT Filed: Mar. 6, 1986

[86] PCT No.: PCT/SU86/00021

§ 371 Date: Nov. 4, 1987

§ 102(e) Date: Nov. 4, 1987

[87] PCT Pub. No.: WO87/05245

PCT Pub. Date: Sep. 11, 1987

[51] Int. Cl.⁴ .............................................. B23K 13/00
[52] U.S. Cl. .................................. 228/2.5; 228/107; 219/8.5; 219/9.5; 219/10.53; 29/419.2
[58] Field of Search ................. 228/107, 109, 2.5, 242, 228/243, 44.5, 49.3; 219/8.5, 9.5, 10.53; 29/421 M, 421 E

[56] References Cited

U.S. PATENT DOCUMENTS

| | | | |
|---|---|---|---|
| 3,017,483 | 1/1962 | Anderson | 219/9.5 |
| 3,699,297 | 10/1972 | Grin et al. | 219/9.5 |
| 4,103,813 | 8/1978 | Debeir | 228/107 |
| 4,513,188 | 4/1985 | Katzenstein | 228/107 |

FOREIGN PATENT DOCUMENTS 122694 9/1980 Japan ............................. 228/107

OTHER PUBLICATIONS

A. E. Slukotsky, Inductory, p. 24, 1965.
A. E. Slukhotsky, "Induktory", 1979, Mashinostroenie (Leningrad), c.f., p. 15, drawing-7.
A. A. Dudin, "Magnitono-impulsnaya Svarka Metallov", 1979, Metallurgia (Moscow), c.f., pp. 18–19, drawing 6b,6d.
P. I. Orlov, "Osnovy Konstruirovania", Book I, 1977, Mashinostroenie (Moscow), c.f., pp. 494–499, 610–611.

Primary Examiner—Nicholas P. Godici
Assistant Examiner—Samuel M. Heinrich
Attorney, Agent, or Firm—Lilling & Greenspan

[57] ABSTRACT

A device for alignment of cylindrical workpieces for magnetic-discharge welding is provided with external and internal aligning sleeves (2,3) installed in an induction heater (1) coaxially and overlapping each other; the external aligning sleeve (2) is made of a non-polarizable dielectric material and features a ledge (4) on the outer surface thereof so that it can be locked by one of the aligning disks (5); the internal aligning sleeve (3) is made of a non-magnetic material having low conductivity and provided, on the inner surface thereof, with step-like shaped through slots (7) and, on the outer surface thereof, with a ledge (6) limiting the depth to which the sleeve (3) can be introduced into the external aligning sleeve (2); the internal aligning sleeve (3) is locked in relation to the induction heater (1) by means of a second aligning disk (10) contiguous to the ledge (6).

1 Claim, 1 Drawing Sheet

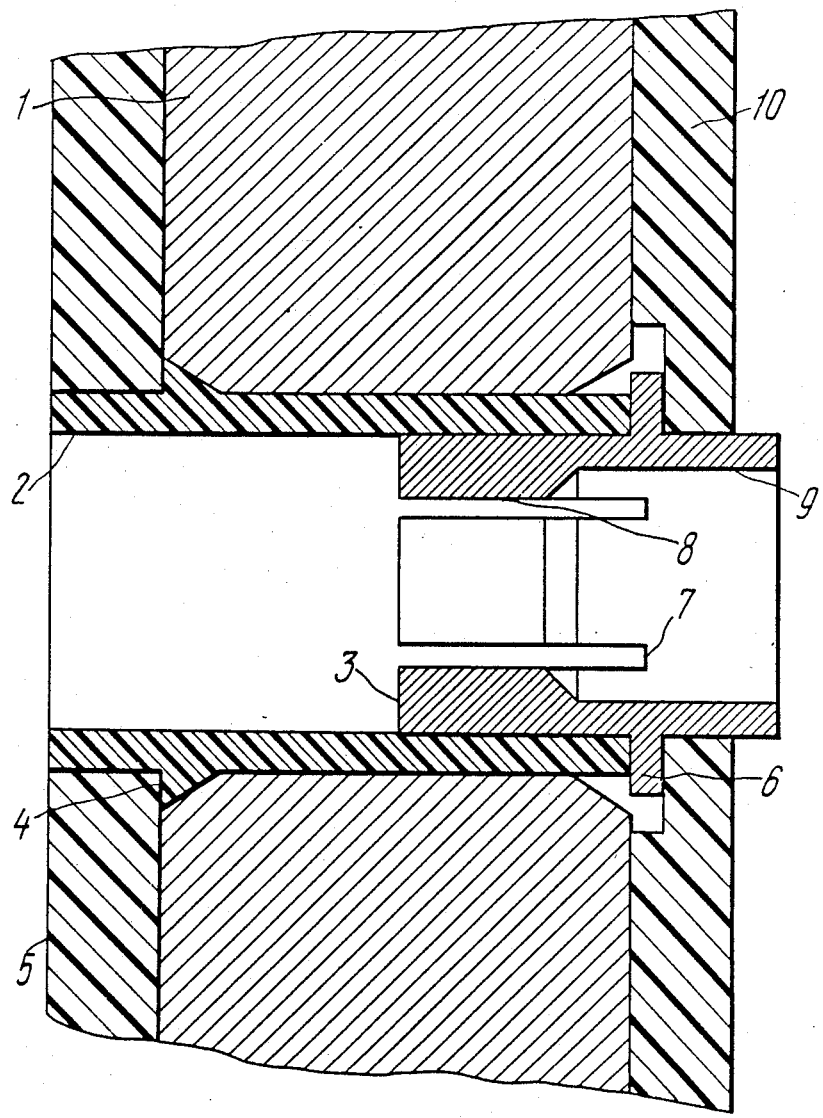

DEVICE FOR ALIGNMENT OF CYLINDRICAL WORKPIECES FOR MAGNETIC-DISCHARGE WELDING

TECHNICAL FIELD

This invention relates to metal processing and welding by intense magnetic fields and, in particular, to a device for alignment of cylindrical workpieces for magnetic-discharge welding of metals.

BACKGROUND ART

The problem of metal processing and welding stabilization aimed at reducing rejects and saving metal has become extremely important. The quality of workpiece processing and welding largely depends on the accurate and durable adjustment of technological equipment and machine-tool attachments used in the production process.

Such requirements are particularly stringent in case of magnetic-discharge welding where only one discharge of the capacitor bank is required for welding and repeated discharges are of no use and the workpiece is rejected. Many researchers and product engineers are engaged in trying to solve the problem of alignment of workpieces affecting the quality of metal processing and welding.

Known in the art is a device for alignment of cylindrical workpieces (A. E. Slukhotsky, "Induktory", 1965, p. 24) which comprises aligning disks made of asbestos cement and installed on the butt face ends of the induction heater.

These disks are provided with openings through which pipes are supplied to the hardening zone.

But this device for alignment of workpieces is deficient in that the depth to which the pipe is introduced into the induction heater zone cannot be regulated. In addition, the asbestos cement soils the outer surface of workpieces to be welded together in the process of the magnetic-discharge welding.

Besides, this device for alignment of pipes cannot provide reliable insulation of the workpieces from the work-coils of the induction heater.

DISCLOSURE OF THE INVENTION

The invention is to provide a device for alignment of cylindrical workpieces for magnetic-discharge welding, which can ensure accurate positioning of workpieces in relation to one another and controlled depth of introduction of workpieces into the zone of the induction heater, while retaining the reliability, simplicity and durability of the device.

This is attained by that a device for alignment of cylindrical workpieces for magnetic-discharge welding, comprising aligning disks installed on the butt surfaces of an induction heater, according to the invention, is equipped with external and internal aligning sleeves installed in the induction heater coaxially and overlapping each other, the external aligning sleeve being made of a non-polarizable dielectric material and provided with a protrusion on the outer surface thereof, to which one of the aligning disks is contiguous to arrest this sleeve, while the internal aligning sleeve is made of a non-magnetic material having low conductivity and provided, on the inner surface thereof, with step-like shaped through slots and, on the outer surface thereof, with a protrusion limiting the depth of introduction of the internal sleeve into the external aligning sleeve and ensuring arrest of the internal sleeve in relation to the induction heater by means of a second aligning disk contiguous to said protrusion.

The external and internal aligning sleeves provided in the induction heater ensure external alignment of workpieces to be welded together in relation to each other.

The external aligning sleeve is made of a non-polarizable dielectric material in order to ensure reliable insulation of workpieces from the work-coil of the induction heater, while the protrusion or ledge on the external surface of the aligning sleeve permits this sleeve to be locked in relation to the induction heater in order to achieve stable welding conditions.

The internal aligning sleeve is made of a non-magnetic material having low conductivity in order to allow magnetic force lines free access to the workpieces and thus reduce to the minimum any losses of electromagnetic power and, also, to keep workpieces in place. The through shaped slots provided in the internal sleeve permit oxide films and gases to be removed from the welding zone.

The protrusion provided on the external surface of the internal sleeve limits the depth of introduction of said sleve into the external aligning sleeve and its motions in relation to the induction heater.

BRIEF DESCRIPTION OF ACCOMPANYING DRAWING

The invention will now be described in greater detail with reference to specific embodiments and an accompanying drawing showing a general view of a device for alignment of cylindrical workpieces for magnetic-discharge welding, according to the invention.

BEST MODE FOR CARRYING OUT THE INVENTION

A device for alignment of cylindrical workpieces for magnetic-discharge welding, according to the invention, comprises an induction heater 1 accommodating an external aligning sleeve 2 and an internal aligning sleeve 3 arranged coaxially and overlapping each other.

The external aligning sleeve 2 is made of a non-polarizable dielectric material, e.g. fluoroplastic, ensuring reliable insulation of workpieces being welded (not shown in the drawing) from the work-coil of the induction heater 1. A ledge 4 is provided on the outer surface of the sleeve 2 near the butt end of the induction heater 1. An aligning disk 5 installed on the butt face of the induction heater 1 is contiguous with said ledge 4. The ledge 4 and the aligning disk 5 lock the external sleeve 2 in the working zone of the induction heater 1, holding the sleeve 2 from longitudinal motions.

The internal aligning sleeve 3 is made of a non-magnetic material, e.g. titanium or stainless steel. A ledge 6 is provided on the outer surface of the sleeve 3 near the butt face of the induction heater 1 in order to limit the depth to which the sleeve 3 can be introduced into the external sleeve 2 and into the work zone of the induction heater 1.

The sleeve 3 also features, on the inner surface thereof, step-like shaped slots 7 which are to reduce the effect of eddy currents and serve as ducts for removal of oxide films and gases from the welding zone.

The slots 7 of a step 8 of the internal sleeve 3 are communicated with a step 9 of the sleeve 3, having a larger inner diameter.

The step 8 of the sleeve 3 is to transport and align the workpieces to be welded, while the step 9 is to reduce the resistance to the flows of gases and oxide films transported along the slots 7.

An aligning disk 10 is contiguous with the ledge 6 of the sleeve 3 since it is secured on the second butt face of the induction heater 1. This disk 10 is to correct any mechanical bends or misalignments of the sleeve 3.

The device for alignment of pipes for magnetic-discharge welding operates as follows.

Workpieces are prepared for welding and placed into the device. The movable workpiece is placed into the external sleeve 2 until it is pressed against the internal sleeve 3. The stationary workpiece is placed into the step 8 of the internal aligning sleeve 3 so that it overlaps the movable workpiece. The butt end of the sleeve 3 is the stop for the movable workpiece being welded, which limits its introduction into the welding zone. In this manner the two workpieces to be welded are reliably and stably locked in the device for the welding period.

After the workpieces are placed in the device, the magnetic-discharge welding is started. As welding progresses, gases and oxide films are freely removed along the slots 7 provided in the internal aligning sleeve 3 with practically no effect on the walls of the external aligning sleeve 2. In this manner welding process is made stable, and the service life of the external aligning sleeve 2 and the internal aligning sleeve 3 is made much longer.

The device proposed herein for alignment of cylindrical workpieces for magnetic-discharge welding is reliable in operation, its design is uncomplicated, it ensures stable welding throughout the perimeter of the cylindrical workpieces being welded together.

INDUSTRIAL APPLICABILITY

This invention can be used for processing and welding of metal cylindrical workpieces by intense magnetic fields, which may be found in manufacturing refrigeration plants, motor building and cryogenic industries, and many other fields.

I claim:

1. A device for alignment of pipes for magnetic-discharge welding, comprising aligning disks installed on butt faces of an induction heater, characterized in that the device is provided with an external aligning sleeve (2) and an internal aligning sleeve (3) installed in the induction heater (1) coaxially and overlapping each other, the external aligning sleeve (2) being made of a non-polarizable dielectric material and provided with a ledge (4) on the outer surface thereof, to which one of the aligning disks (5) abuts to lock the external aligning sleeve (2), while the internal aligning sleeve (3) is made of a non-magnetc material having low conductivity and provided, on the inner surface thereof, with step-like shaped through slots (7) and, on the outer surface thereof, with another ledge (6) limiting the depth to which the internal aligning sleeve (3) can be introduced into the external aligning sleeve (2); the internal sleeve (3) is locked in relation to the induction heater (1) by means of a second aligning disk (10) contiguous to the another ledge (6).

* * * * *